(12) United States Patent
Gretz

(10) Patent No.: US 6,281,434 B1
(45) Date of Patent: *Aug. 28, 2001

(54) ELECTRICAL OUTLET RACEWAY

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/767,337

(22) Filed: Jan. 22, 2001

Related U.S. Application Data

(63) Continuation of application No. 09/239,620, filed on Jan. 29, 1999, now Pat. No. 6,180,878.

(51) Int. Cl.[7] .................................................. H02G 3/04
(52) U.S. Cl. ........................... 174/48; 174/68.1; 439/210
(58) Field of Search ........................... 174/48, 64, 68.1, 174/68.2, 68.3, 72 A, 72 R, 99 R, 100; 439/120, 135, 210, 212; 220/3.92, 3.94; 52/220.7

(56) References Cited

U.S. PATENT DOCUMENTS

| | | | |
|---|---|---|---|
| 3,308,416 | * 3/1967 | Boyd | 439/115 |
| 4,017,137 | * 4/1977 | Parks | 439/115 |
| 4,690,474 | * 9/1987 | Smart et al. | 439/120 |
| 5,523,529 | * 6/1996 | Holliday | 174/101 |
| 5,614,695 | * 3/1997 | Benito Navazo | 174/48 |
| 6,037,538 | * 3/2000 | Brooks | 174/48 |

* cited by examiner

Primary Examiner—Dean A. Reichard
Assistant Examiner—Dhiru R Patel

(57) ABSTRACT

A simplified extensible raceway for electrical outlets including a cutable raceway that includes an electrical extension cord that can plug into an existing outlet and be extended in any direction by connection within the raceway to electrical outlet box(es) that engage the raceway and an existing supporting structure. The raceway and associated electrical outlet system can be extended by the addition of additional pairs of electrical extension cords having both male and female ends connected to additional electrical outlets.

5 Claims, 1 Drawing Sheet

ELECTRICAL OUTLET RACEWAY

This application is a continuation of U.S. patent application Ser. No. 09/239,620 filed Jan. 29, 1999 now U.S. Pat. No. 6,180,878.

FIELD OF THE INVENTION

The present invention relates to a do-it-yourself electrical distribution system that utilizes an extensible raceway that includes extension cords connecting outlet boxes that can be mounted at varying positions along the raceway. The system permits easy installation of external outlets that can be placed at various distances along the raceway.

BACKGROUND OF THE INVENTION

Wall outlets provide access to electrical service in buildings and home. It is not unusual, especially in older structures, that it is desired to provide additional outlets along or up a wall to accommodate the installation of additional electrical equipment. A wide variety of so-called "power strips", track systems and cordless extension systems have been designed and provided for this purpose. The installation of conventional track systems generally requires "hard wiring" of the system into the existing electrical system of the structure. This tends to be complicated and dangerous for the homeowner. To overcome this problem, systems such as that described in U.S. Pat. No. 5,603,621 to Elmouchi, that include an adaptor that enables manual electrical coupling between a conductor strip and a conventional duplex wall outlet when the adaptor is positioned over the face of the outlet have been designed. U.S. Pat. No. 5,306,165 to Nadeau describes an electric power distribution system that plugs into an existing outlet and along which various wall outlets may be positioned. U.S. Pat. No. 2,979,686 to Longmire shows a raceway plugged into an existing wall outlet that may be extended using a series of additional raceways to form an arrangement where an electrical plug can be plugged into the raceway at varying lengths.

While all of the foregoing provide useful solutions to the problem of adding electrical distribution inside of a structure without hard wiring, there remains the problem of terminating the raceway contained wiring or conductor strip when the length of the section of raceway purchased does not exactly meet the length required for a particular installation. For example, if one were running such a strip along the base of a wall from a point that required a turn at a corner two feet, three and one half inches from the last junction, it would be necessary to cut the purchased strip to obtain such an odd length. This poses the problem of joining the next strip section, to that already cut, at the corner. A similar problem could occur in any installation and for a variety of reasons.

SUMMARY OF THE INVENTION

The present invention provides a simplified extensible raceway for electrical outlets comprising a cutable raceway that includes an electrical extension cord that can plug into an existing outlet and be extended in any direction by connection within the raceway to electrical outlet box that engages the raceway and an existing supporting structure and includes an additional pair of electrical extension cords having both male and female ends. Terminal electrical outlet boxes are also provided.

DETAILED DESCRIPTION

Figure 1:
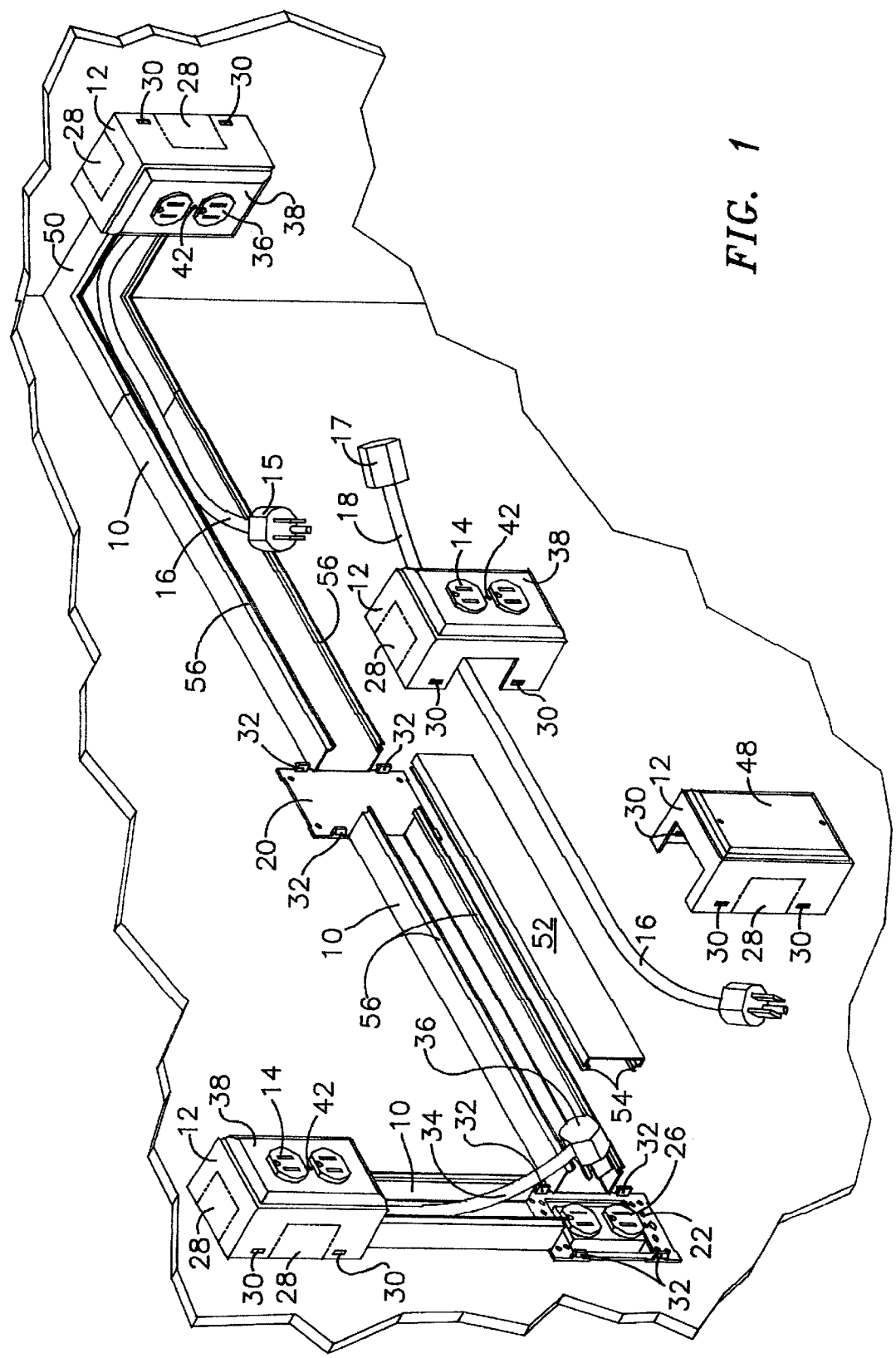
FIG. 1 is a partially blown-apart view of the electrical outlet raceway of the present invention.

As shown in FIG. 1, the electrical outlet raceway system of the present invention comprises raceway 10, outlet box (es) 12, electrical outlet(s) 14, and male 15 and female 17 connector equipped extension cords 16 and 18. Attachment plates 20, and 22, whose function will be explained hereinafter, are mounted on surface 24 to which the raceway system is being attached.

Raceway 10 is preferably manufactured from a material that is easily cut to length such as a plastic. Since extension cords 16 and 18, described below, already have an insulation layer thereon, raceway 10 could be fabricated from an easy to cut metal such as aluminum or some other thin gauge metal.

Each of outlet boxes 12 include breakaway channel entries 28 on all four sides and slots 30 in their side walls for engagement with tabs 32 on outlet mounting plates 20. Each of electrical outlets 14 has connected thereto or integrated therewith at least one extension cord 16 and/or 18. In the case where the initial connection is being made with an existing electrical outlet 26, the electrical outlet 14 is equipped with a single extension cord 34 having a male connector 36 whose tines extend at right angles from extension cord 34 to make installation easier. In the case of the terminal electrical outlet 36, it is equipped with a single male connector 15 equipped extension cord 16 since a second extension cord is not required.

Those outlet mounting boxes 12 that include an electrical outlet 14 have a cover plate 38 that includes openings for electrical outlets 14. Cover plates 38 include a screw hole 40 for insertion of screw 42 that secures electrical outlet 14 in outlet box 12. Cover plate 38 is preferably formed as an integral unit with outlet box 12, but may also be a separate unit attached to outlet box 12 by means of screws (not shown). In the case of the initial attachment of the raceway system of the present invention with the existing outlet 26, a solid cover plate 44 is included in outlet box 12.

Raceway cover 52 having flanges 54 that engage mating flanges 56 on raceway 10 provide the means for closing raceway 10 after installation as described below.

In the case where it is necessary to carry the raceway system of the present invention around a corner, an angular raceway section 50 can be provided. In the alternative, a miter may be cut in the top and bottom surfaces of raceway 10 and raceway 10 then bent around the corner using its rear surface to hold it together. In the case of an outside angled corner, an appropriate raceway member formed for such purpose is used.

Installation of the raceway system of the present invention is accomplished by selecting an existing outlet 26 from which it is desired to extend further outlets. The conventional cover plate (not shown) is removed and outlet-mounting plate 22 attached about existing outlet 26. At those locations where it is desired to mount an outlet box, outlet mounting plate(s) 20 are attached to surface 24 using appropriate fasteners. Outlet mounting plate 22 is a modified version of mounting plate 20 having an opening at the center thereof to permit access to existing outlet 26 while providing tabs 32 for attachment of outlet box 12 thereover. Sections of raceway 10 are then cut to the appropriate length, if necessary, and applied to surface 24 extending in the direction that installation of additional outlets is desired, either vertically or horizontally as shown in the FIG. 1. Raceway sections 10 may be attached to the wall or held in place by engagement of the openings provided by removal of break away channel entries 28 in outlet box(es) 12 with raceway 10. It is preferred that mounting plates 20 be attached to surface 24 using some appropriate fastener or adhesive. Once mounting plates 20 and raceway 10 are properly sized and secured, the appropriate type of outlet box 12, terminal, in-line or initial connection, is installed at each of the appropriate locations, as shown in FIG. 1, by engaging tabs 32 with slots 30. The various extension cords 16 and 18 are then plugged together and inserted into raceway 10. As is apparent, when a section of raceway 10 has been shortened by cutting, extension cords 16 and 18 are "shortened" by folding or otherwise inside of raceway 10. If electrical outlets 14 are located at the ends of several sections of raceway 10, an appropriate length of extension cord can be installed in raceway 10 therebetween. Cover 52 is then snapped into place over raceway 10 by engagement of flanges 54 and 56. Finally, connection of the installed system is made to existing electrical outlet 26 and the final outlet box 12, having a solid cover plate 48 in lieu of an electrical outlet, engaged with modified mounting plate 22, to complete the installation.

As the invention has been described, it will be apparent to those skilled in the art that the same may be varied in any ways without departing from the spirit and scope thereof. Any and all such modifications are intended to be included within the scope of the appended claims.

What is claimed is:

1. An extensible electrical outlet raceway for installation on a surface comprising:

a) one or more cutable raceway sections having raceway sides, an open side and elongated parallel flanges along edges of each of said raceway sides that define said open side;

b) at least one outlet box having sides, a top, and a bottom, and an open front, removable channel entries that, when removed, are of a size and shape to receive said cutable raceway sections;

c) at least one electrical outlet having an extension cord member connected thereto mounted inside of said at least one box;

d) at least one mounting plate for attachment to said surface and having an attachment for attachment of at least one outlet box to said mounting plate; and e) an elongated generally planar cover having two long parallel edges and parallel flanges for covering said elongated parallel flanges on said cutable raceway sections; and said extension cord member capable of establishing a continuous electrical circuit between said electrical outlet and other outlets when a series of two or more of said mounting plates are attached to said surface with said cutable raceway sections extending between said mounting plates.

2. The extensible outlet raceway of claim 1 wherein said cutable raceway sections are fabricated from plastic.

3. The extensible outlet raceway of claim 1 wherein said extension cord member capable of engaging an existing outlet includes a male plug mounted at a right angle to said extension cord member.

4. The extensible outlet raceway of claim 1 further including a modified mounting plate about said existing electrical outlet, said modified mounting plate having an opening in the center thereof to permit access to said existing electrical outlet.

5. The extensible outlet raceway of claim 1 further including at least one section of said cutable raceway sections that is angular to permit continuation of said cutable raceway sections around a corner.

* * * * *